United States Patent
Vikberg et al.

(10) Patent No.: US 8,254,313 B2
(45) Date of Patent: Aug. 28, 2012

(54) METHOD AND ARRANGEMENT FOR SELECTING A PUBLIC LAND MOBILE NETWORK USING UNLICENSED ACCESS NETWORKS

(75) Inventors: Jari Vikberg, Järna (SE); Tomas Nylander, Värmdö (SE)

(73) Assignee: Telefonaktiebolaget L M Ericsson (Publ), Stockholm (SE)

( * ) Notice: Subject to any disclaimer, the term of this patent is extended or adjusted under 35 U.S.C. 154(b) by 341 days.

(21) Appl. No.: 12/742,203

(22) PCT Filed: Nov. 8, 2007

(86) PCT No.: PCT/EP2007/009704
§ 371 (c)(1),
(2), (4) Date: May 10, 2010

(87) PCT Pub. No.: WO2009/059623
PCT Pub. Date: May 14, 2009

(65) Prior Publication Data
US 2010/0278107 A1 Nov. 4, 2010

(51) Int. Cl.
*H04W 4/00* (2009.01)
(52) U.S. Cl. ...................................................... 370/328
(58) Field of Classification Search .................. None
See application file for complete search history.

(56) References Cited

U.S. PATENT DOCUMENTS
2006/0019658 A1* 1/2006 Gallagher et al. ......... 455/426.1

FOREIGN PATENT DOCUMENTS
EP 1096728 A 5/2001

OTHER PUBLICATIONS

"Digital Cellular Teleoommunications System (Phase 2+); Generic Access to the A/Gb Interface; Stage 2 (3GPP TS 43.318 Version 7,3.0 Release 7); ETSI TS 143 318" ETSI Standards, Lis, Sophia Antipolis Cedex, France, vol. 3-G1. No. V7.30, Oct. 1, 2007 XP014040302.

\* cited by examiner

*Primary Examiner* — Kwang B Yao
*Assistant Examiner* — Tung Q Tran
(74) *Attorney, Agent, or Firm* — Roger S. Burleigh

(57) ABSTRACT

When a mobile station (MS) seeks access to a public land mobile network (PLMN) via an unlicensed or generic access networks (GAN) it first registers with a default GAN. If the default GAN is unable to serve the MS at its current location, it redirects the MS to other GANs serving the same of different PLMNs. However, when using the existing registration and redirection process, an MS has no means of knowing what services are provided by a specific combination of GAN and PLMN. In accordance with the present invention this is achieved by indicating for each PLMN and serving GANC an operation mode supported by the GANC. This operation mode being indicative of the interface used for communication between the GANC and PLMN it serves.

22 Claims, 5 Drawing Sheets

| 8 | 7 | 6 | 5 | 4 | 3 | 2 | 1 | |
|---|---|---|---|---|---|---|---|---|
| GAN PLMN List ||||||||  octet 1 |
| ext | Length of GAN PLMN List value contents |||||||  octet 2, 2a |
| Number of PLMNs ||||||||  octet 3 |
| PLMN information, PLMN 1 ||||||||  octet 4 |
| PLMN information, PLMN n ||||||||  octet n+3 |

Fig. 5a

| 8 | 7 | 6 | 5 | 4 | 3 | 2 | 1 | |
|---|---|---|---|---|---|---|---|---|
| MCC ||||||||  octet x+1 |
| MNC |||| MCC ||||  octet x+2 |
| MNC ||||||||  octet x+3 |
| Spare ||| SGM | GSZI | GANC-ADDR || SEGW-ADDR ||  octet x+4 |
| GANC-SEGW Address information ||||||||  |
| GANC Address information ||||||||  |
| GAN Service Zone information ||||||||  |

Fig. 5b

| 8 | 7 | 6 | 5 | 4 | 3 | 2 | 1 | |
|---|---|---|---|---|---|---|---|---|
| MCC ||||||||  octet x+1 |
| MNC |||| MCC ||||  octet x+2 |
| MNC ||||||||  octet x+3 |
| Spare ||| SGMI | GSZI | GANC-ADDR || SEGW-ADDR ||  octet x+4 |
| GANC-SEGW Address information ||||||||  |
| GANC Address information ||||||||  |
| GAN Service Zone information ||||||||  |
| Supported GAN Modes Information ||||||||  |

Fig. 5c ically defined in the $3^{rd}$ generation partnership
METHOD AND ARRANGEMENT FOR SELECTING A PUBLIC LAND MOBILE NETWORK USING UNLICENSED ACCESS NETWORKS

FIELD OF INVENTION

The invention is directed generally to unlicensed mobile access (UMA) and with particular reference to generic access networks as initially defined in the 3$^{rd}$ generation partnership project (3GPP) TS 43.318 and 44.318 for 3GPP Releases 6 and 7. It relates specifically to the manner in which mobile stations and user equipments can select between several generic access networks (GAN) and public land mobile networks (PLMN).

BACKGROUND ART

Unlicensed mobile access generally describes the accessing of public land mobile networks using access networks that utilise a typically low-power unlicensed-radio interface to communicate with mobile stations. Existing access networks typically include broadband networks that may include both wireless and wired portions, preferably IP networks, such as wireless LANs, in which higher layer protocols, such as the GSM protocols, are run over an IP network rather than over the associated GSM radio layer. An access network controller communicates over the IP network with mobile stations that are connected to the network via access points. The access network controller also controls the interface with the public mobile network core elements that provides specific services to the mobile stations depending on the type of the public mobile core network. A security gateway also forms part of the access network and is either combined with the access network controller in a single node or implemented as a separate node. Access networks of this type have been used to provide access to second generation PLMNs including GSM (Global System for Mobile Communication), EDGE (Enhanced Data rates for GSM Evolution) and GPRS (General Packet Radio Service networks), which are often grouped under the term GSM/EDGE radio access networks or GERAN. In this context, unlicensed access networks are referred to as generic access networks (GAN) and the access network controller is called a generic access network controller or GANG. Work is now ongoing in 3GPP for Release 8 to specify generic access networks for third generation services UMTS (Universal Mobile Telecommunications System) or WCDMA (Wideband Code Division Multiple Access). The corresponding technical specifications will be called 3GPP TS 43.319 and 44.319 and will also include the previous content from specifications 43.318 and 44.318 in 3GPP Releases 6 and 7

In the case of both second and third generation public mobile networks the generic access networks are designed to communicate directly with the core elements of a standard public mobile network. The generic access network is constructed so that the core network elements, such as the mobile switching centers MSC of the public mobile network, view the access network as a conventional base station BSS or radio network controller RNC. In the present GAN standard, this is achieved by constraining the GANG to use second generation GSM interfaces towards the core network. In other words, the GANG communicates via the A-interface with mobile services switching centers MSC for circuit-switched services and via the Gb-interface with Serving GPRS support nodes (SGSN) for packet-switched services. For third generation mobile networks it is proposed that the GANG should use WCDMA/UMTS interfaces towards the mobile core network, i.e. an Iu-cs interface towards the mobile services switching center MSC for circuit-switched services and Iu-ps interface towards the serving GPRS support node (SGSN) for packet-switched services. It is further envisaged that some generic access network controllers will use both second and third generation interfaces towards the core network elements, and hence be capable of supporting the services of both network types. The interfaces used between the access network controller and core network determine which services and the performance for some services that can be delivered to the mobile stations.

Mobile stations capable of using a generic access network support a wireless IP access technology, such as Bluetooth or Wi-Fi, in addition to GERAN radio interfaces and hence are capable of operating in either generic access network mode (GAN-mode) or GERAN-mode. Such a terminal may additionally support UNITS terrestrial radio access network interfaces (UTRAN interfaces) and hence offer three modes of operation. When the mobile station wants, or needs, to switch from GERAN/UTRAN mode to GAN-mode operation, i.e. to use a generic access network rather than the public mobile access network to access core network services, it must first register with a generic access network controller GANC that serves its current location. Since the mobile station may not have the necessary address information stored it will first register with a default GANC, which is located in the public land mobile network to which the mobile station subscribes, also known as the home public land mobile station HPLMN. The mobile station thus sends a register request message to the default GANC, and the message includes an indication of the current location of the MS in the form of the identity of the serving cell. If the default GANC is unable or unwilling to serve the mobile station in this location based, for example, on network configuration operator policies, it will redirect the mobile station to another GANC within the same PLMN or even present a choice of GANCs that are associated with different PLMNs by sending a GAN PLMN list in accordance with the mentioned 3GPP standards.

A problem with the registration process within the generic access network is that the end user is unable to select a specific service when presented with a choice of PLMN-GANC pairs. In other words, whilst a specific PLMN may offer both second and third generation services over the generic access network, the end user has no means of knowing which of these services is supported by a specific serving GANC included in the GAN PLMN list.

It is thus an object of the present invention to improve the transparency of the registration process within an unlicensed access network.

It is a further object of the present invention to improve the registration process to provide the necessary service information to enable the end user or the mobile station to exercise an informed choice when selecting unlicensed access to a public land mobile network.

SUMMARY OF THE INVENTION

The above and further objects of the invention are achieved in a generic or unlicensed access network registration method, in an unlicensed access network controller and in a mobile station in accordance with the appended claims.

More specifically, the invention resides, according to one aspect, in a method of redirecting a mobile station to at least one public mobile network accessible via an unlicensed access network. This method includes establishing a connection between a mobile station and an unlicensed access network controller, this unlicensed access network controller being arranged to serve a public mobile network. An unlicensed access network controller is understood to serve a public mobile network when it provides access to this public mobile network via the unlicensed access network. The access network controller then receives a registration request from the mobile station; this registration request includes information indicative of the location of the mobile station. Assuming that the unlicensed access network controller cannot or will not accept registration from the mobile station, either because it does not serve the mobile station's current location, or because the registration request included an explicit indication to retrieve all the "PLMNs" accessible via unlicensed access network in the current location, it then sends a registration redirect message to the mobile station. This registration redirect message includes information identifying public land mobile networks available for access via the unlicensed access network at the location of the mobile station and also identifies for each identified public mobile network at least one unlicensed access network controller adapted to serve the public mobile network. In accordance with the present invention, this information further includes for each public mobile network and serving unlicensed access network controller an operation mode supported by the unlicensed access network controller, this operation mode being indicative of the interface used for communication between the unlicensed access network controller and the public mobile network it serves.

Using this information, the mobile station is then able to select a public mobile network and access network controller according to the operation mode available. This selection may be based on end user and/or network operator preferences for a specific operation mode or a for combination of operation mode and the public land mobile network and serving unlicensed access network pair. The registration request could be triggered by the mobile station accessing the unlicensed access network in a new location or it could be triggered by the end user as a request to retrieve all the PLMNs accessible via unlicensed access network in the current location, for example, in order to select a specific operation mode that may affect the availability and performance of some services.

The operation mode is preferably indicative of either second-generation mobile network (GSM/EDGE/GPRS also known as GERAN) interfaces, i.e. A- and Gb interfaces for voice and data traffic, respectively, as defined in 3GPP TS 48.008 and 3GPP TS 48.018, or third-generation mobile network (UTMS/WCDMA also known as UTRAN) interfaces, i.e. Iu-cs- and Iu-ps-interfaces, for voice and data traffic, respectively as defined in 3GPP TS 25.410. Alternatively the operation mode may indicate that all, or a combination of these interfaces are supported.

The information is preferably compiled in a list, which includes an information element for each unlicensed access network controller that serves an available public mobile network. Each information element identifies the unlicensed access network controller and includes at least one bit to indicate the operation mode. This list is then sent as part of the register redirect message to the mobile station.

Preferably, the register request message is sent by the mobile station to a default unlicensed access network controller that serves the home public mobile network for the mobile station. In other words, the request is sent to the serving unlicensed access network for the public mobile network to which the mobile station subscribes. This means that the HPLMN is in control of which other PLMNs the subscribers are allowed to access.

In accordance with a further aspect, the invention resides in an unlicensed access network controller adapted to communicate with mobile stations over a broadband access network and to serve a public mobile network by providing access to the public mobile network for mobile stations via public mobile network interfaces. The unlicensed access network controller is adapted to receive register requests from mobile stations requesting access to a public mobile network and to identify from information included in said register requests the public mobile networks and associated serving unlicensed access network controllers available at the location of said mobile station. The unlicensed access network controller is further adapted to compile information of available public mobile networks and serving unlicensed access network controllers in a registration redirect message to be transmitted to the mobile station. This information includes for each public mobile network and serving unlicensed access network controller an operation mode supported by the unlicensed access network controller that is indicative of the interface used for communication between the unlicensed access network controller and the public mobile network it serves.

In accordance with a still further aspect, the present invention resides in a mobile station adapted to communicate with public land mobile networks via public land mobile access networks using at least one public land mobile network radio access technology and via unlicensed radio access network controllers using unlicensed radio access technology. This mobile station is could thus be capable of communicate with a GAN, GERAN or UTRAN. The mobile station comprises a logic module adapted to send a registration request message to an unlicensed access network controller in order to obtain access to a public mobile network. This registration request message includes information identifying the mobile station location. The logic module is further adapted to receive in response a registration redirect message including information of available public mobile networks and serving unlicensed access network controllers. This information includes for each public mobile network and serving unlicensed access network controller an operation mode supported by said unlicensed access network controller that is indicative of the interface used for communication between said unlicensed access network controller and the public mobile network it serves. The logic module is further adapted to attempt registration with a selected one of the serving unlicensed access network controllers to obtain access to the corresponding public mobile network with a specific operation mode.

In accordance with a preferred embodiment of the present invention, the mobile station module is further adapted to select one of the available public mobile networks and serving unlicensed access network controllers based on the supported operation mode provided in the registration redirect message. The mobile station is preferably adapted to select a public mobile network and a serving unlicensed access network controller according to configured preferences for a specific operation mode, for a particular combination of public mobile network and serving unlicensed access network controller, or for both of these. These configured preferences may be network operator or end user preferences.

Alternatively, or additionally, the module is adapted to display information relating to at least one available public mobile network and serving unlicensed access network controller to the end user, with this information including an indication of the supported operation mode, to enable a manual selection. Preferably the module is adapted to order and/or filter information based on configured preferences for a specific operation mode, for a particular combination of public mobile network and serving unlicensed access network controller, or for both of these. These configured preferences may be end user or network operator imposed

BRIEF DESCRIPTION OF THE DRAWINGS

Further objects and advantages of the present invention will become apparent from the following description of the preferred embodiments that are given by way of example with reference to the accompanying drawings. In the figures:

FIGS. 5a, 5b and 5c illustrate the content of a public mobile land list transmitted by a default generic access network controller to a mobile station on registration.

DETAILED DESCRIPTION OF THE DRAWINGS

Figure 1:
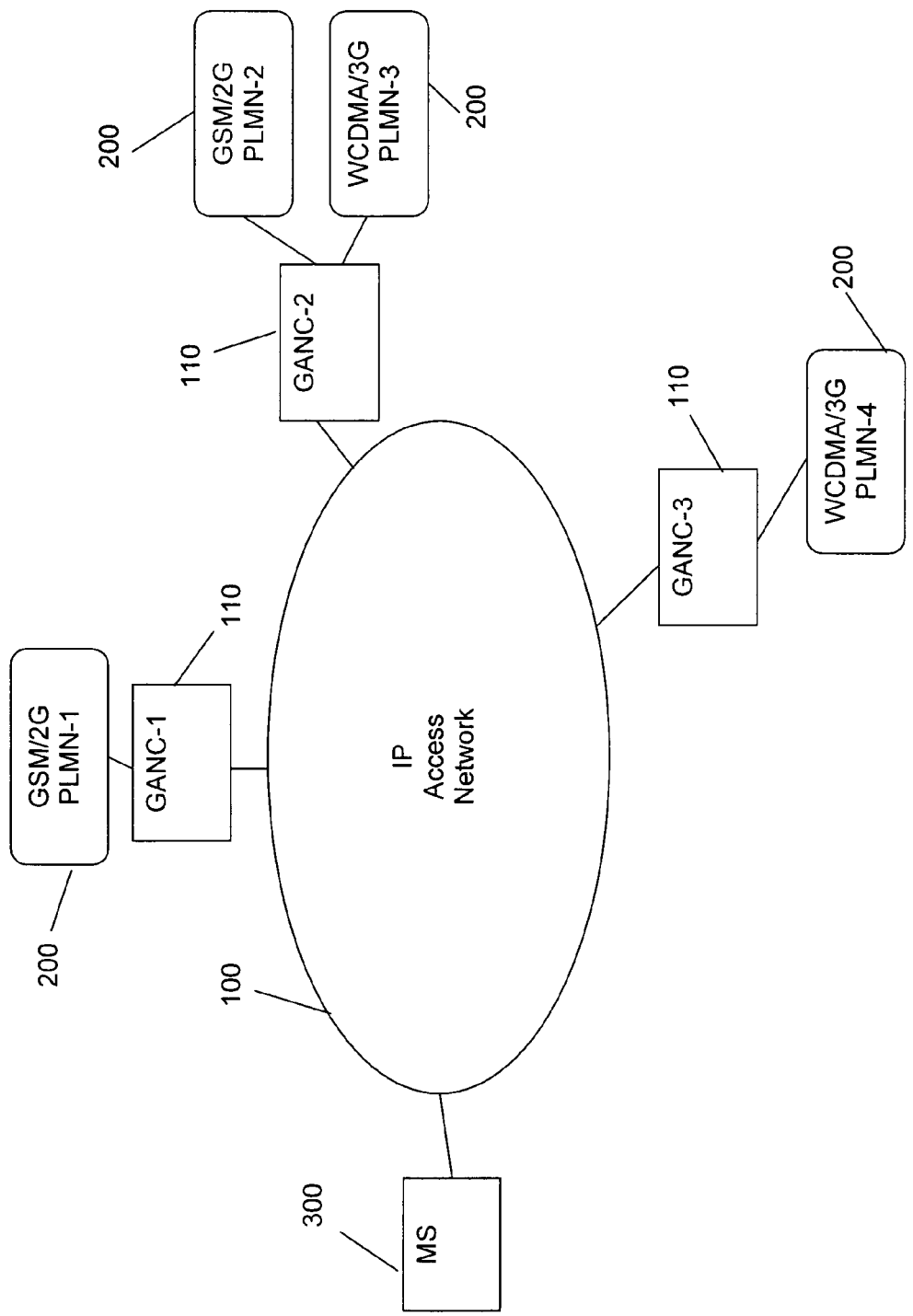
FIG. 1 schematically illustrates the connection provided by an unlicensed generic access network between a mobile station and several public land mobile networks.

The connection provided by a generic access network between a mobile station and several public land mobile networks is illustrated schematically in FIG. 1. The generic access network includes an IP access network 100, to which a mobile station 300, hereinafter referred to as MS, is connected either directly or via a not shown access point. The mobile station 300 communicates over the IP access network 100 with one of the three illustrated generic access network controllers 110, hereinafter referred to as GANC, which also form part of the generic access network. Once a MS 300 is registered with a GANC 110, the GANC 110 permits access to the public land mobile network 200, hereinafter referred to as PLMN, which it serves. In FIG. 1, GANC-1 110 serves PLMN-1 200, which is a second generation (2G) GSM and GPRS network. The GANC-1 110 accordingly supports these 2G services. GANC-3 110 serves PLMN-4, which is a WCDMA, or third generation (3G), network. GANC-3 110 accordingly supports 3G services. GANC-2 110 in FIG. 1 is shown connected to two PLMNs 200, namely, PLMN-2 200, which is a 2G network, and PLMN-3 200, which is a 3G network. GANC-2 110 is thus capable of providing access to either 2G or 3G services depending on which PLMN 200 it is required to serve for a given MS 300. The PLMN numbers illustrated refer to an identification of a public land mobile network. In reality, a PLMN 200 may include more than one network. Consequently, it would be possible, though not shown in FIG. 1, for a GANC 110 to be connected to both a 2G network and a 3G network that share the same PLMN code. As an example in relation to FIG. 1, both the 2G network and the 3G network, where GANC-2 is connected to, could be using the same PLMN-code, e.g. PLMN-2. To a MS 300 connecting through such a GANC 110, this configuration would then appear as a single GANC connected to a single PLMN, both of which support 2G and 3G services.

Figure 2:
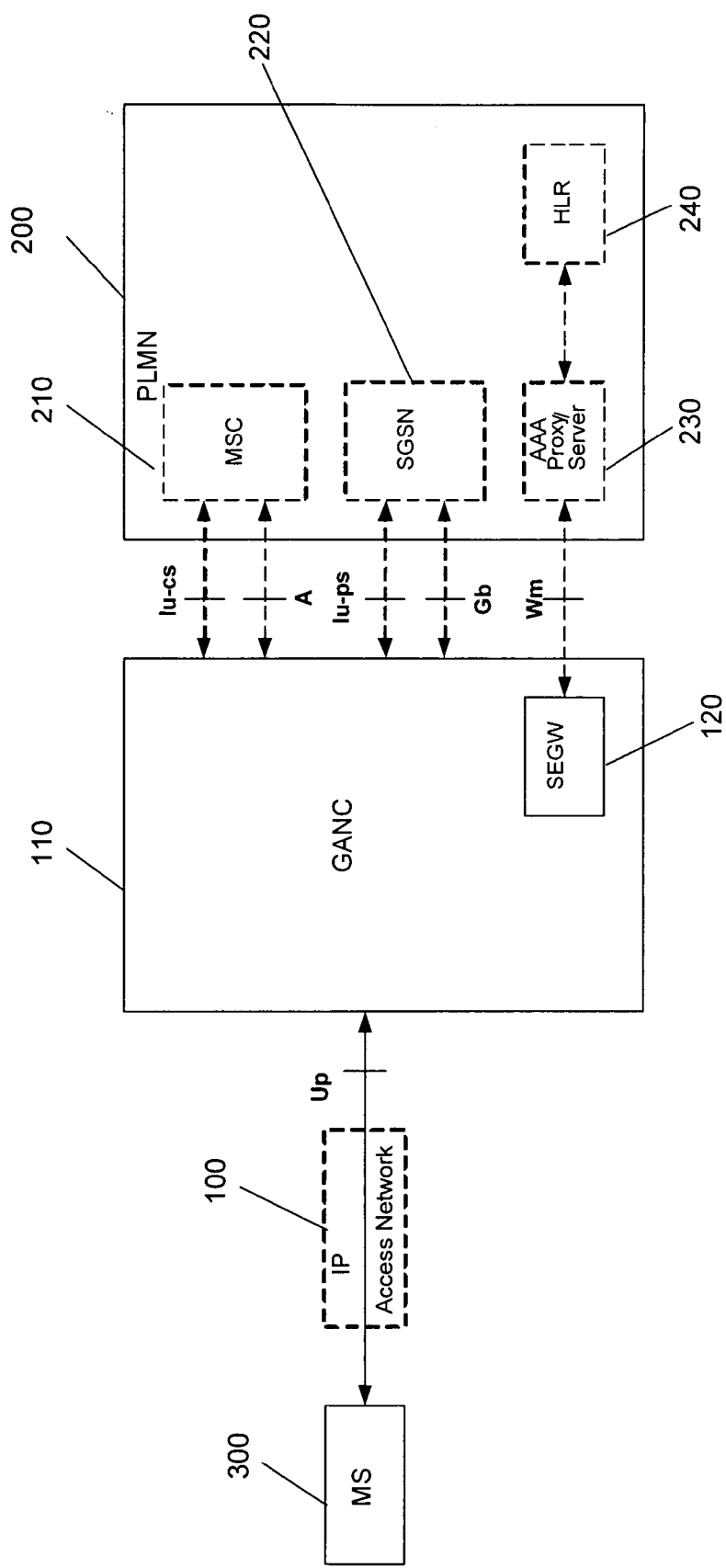
FIG. 2 illustrates schematically the functional architecture of a generic access network that supports both second and third generation services offered by a public land mobile network, FIG. 3 schematically depicts the circuit-switched control plane architecture of a dual-mode mobile station capable of supporting both GSM and generic access modes.

The interfaces between a MS 300, a GANC 110 and various elements of a PLMN 200 are illustrated in FIG. 2. In this illustrated embodiment, both the GANC 110 and the PLMN 200 support both 2G and 3G services. As shown in FIG. 2, the interface between the MS 300 and GANC 110 via the IP access network 100 is a Up interface. This interface defines both the connection through the IP network 100 and the air interface between the MS 300 and the IP network 100 that uses an unlicensed radio technology, such as Bluetooth, DECT, Wi-Fi or the like. Within the GANC 110 there is shown a security gateway 120, hereinafter referred to as SEGW. Whilst this element is illustrated as part of the GANC 110, it should be understood that the SEGW may be comprised in a separate node, although it will always be functionally associated with the GANC 110. The SEGW 120 serves essentially to terminate secure remote access tunnels from the MS 300 through the access network 100, providing mutual authentication, encryption and data integrity for signalling, voice and data traffic. Within the PLMN 200 two switching nodes are illustrated. These are a mobile services center MSC 210 handling circuit-switched, or voice, traffic and a serving GPRS support node SGSN 220 for handling packet-switched traffic, such as data, video or VoIP traffic. A third node is the authentication, authorisation and accounting (AAA) proxy or server 230, which communicates with the security gateway SEGW 120 and a home location register HLR 240. The structure and operation of both the AAA proxy or server and the home location register 240 as well as their interaction with, for example, the MS 300 is known in the art and will not be described further here. Furthermore, it should be understood that only those elements that are necessary for describing the present invention are shown in FIG. 2. Those of ordinary skill in the art will know that both elements may include or interact with other elements that are not illustrated in the figures.

The generic access network 100, 110 is essentially transparent when viewed from the PLMN core network nodes. This is achieved by the GANC 110 utilising the standard PLMN interfaces towards the various nodes. As illustrated in FIG. 2, the GANC 110 utilises the A-interface towards the mobile services switching center MSC 210 for 2G voice traffic (as defined in as defined in 3GPP TS 48.008) and the Gb-interface towards the serving GPRS support node SGSN 220 when providing access to 2G/GPRS services (as defined in 3GPP TS 48.018). When the GANC 110 provides access to 3G services (WCDMA/UMTS), it uses the Iu-cs interface towards the MSC 210 and the Iu-ps interface towards the SGSN 220 (as defined in 3GPP TS 25.410). Accordingly, when the GANC 110 operates in a 2G mode, i.e. using the A/Gb-interfaces it appears as a conventional GSM base station controller (BSC), whilst when operating in a 3G mode with the Iu-cs/Iu-ps-interfaces it appears as a conventional UMTS radio network controller (RNC). Since these two modes of operation are distinguished by the interfaces used, they will hereinafter be referred to as the A/Gb-mode (for 2G services) and the Iu-mode (for 3G services). The GANC 110 selects the required mode of operation, i.e. either A/Gb mode or Iu-mode for each MS 300 connected to it, and uses this mode as long as the MS is connected to the GANC 110.

Figure 3:
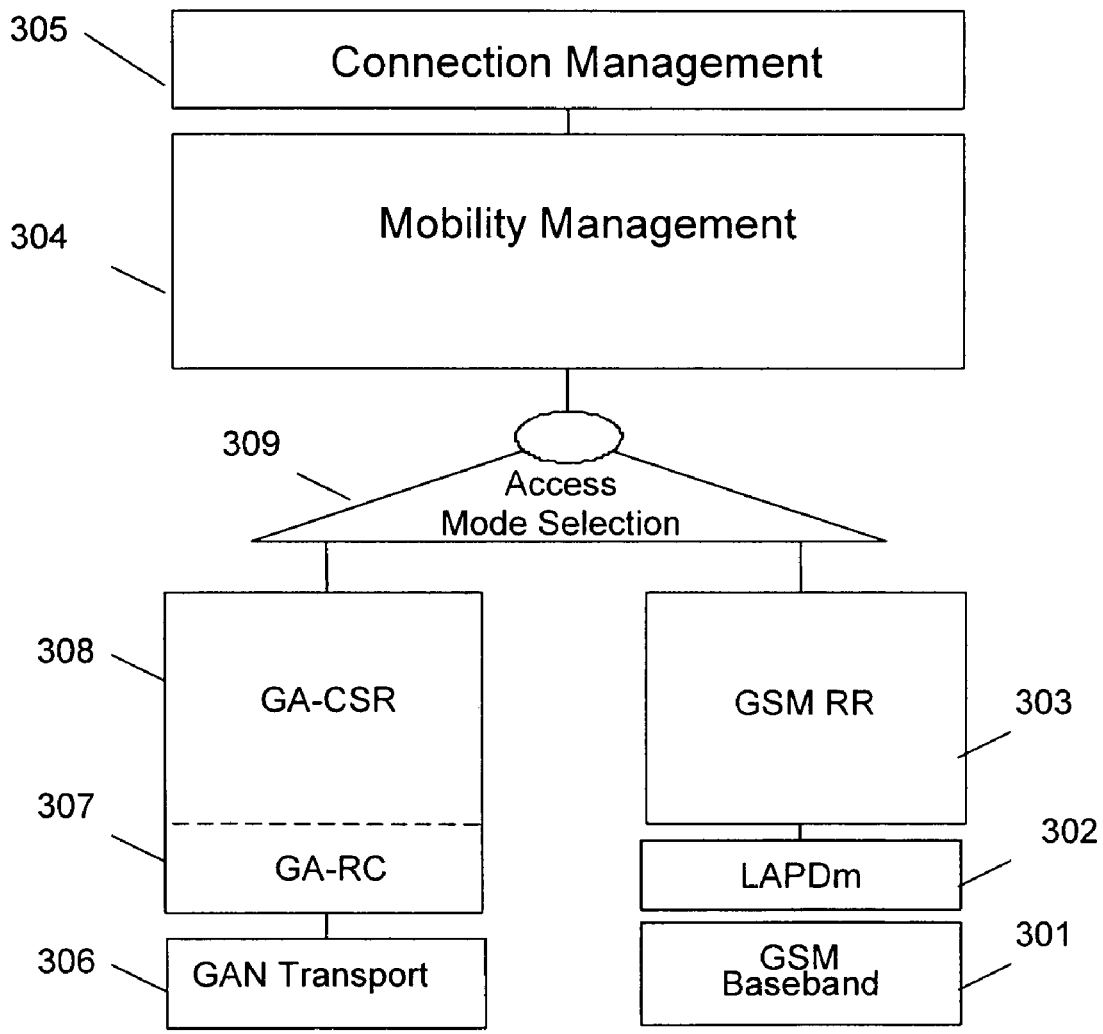

The circuit-switched control plane architecture of a mobile station MS capable of connecting with a PLMN via a generic access network is illustrated in FIG. 3. The control plane includes conventional Mobility Management 304 and Connection Management 305 layers, which are essentially the same as in a conventional GSM MS. Below these layers are the conventional GSM baseband 301, LAPDm 302 and Radio Resource (RR) 303 layers. But parallel to these known layers are alternative lower level layers for controlling access via a generic access network (GAN), which will be referred to as GAN-layers. These GAN-layers include an access and transport layer 306, which will include another radio layer, such as WLAN as well as an IP transport layer. Also included is a Generic access Resource control GA-RC-layer 307, which manages the IP connection, including registration procedures with the generic access network, and a generic access circuit-switched resources GA-CSR layer 308, which performs functionality that is equivalent to the GSM-RR protocol 303 (i.e. providing coordination for roving and handover), using the connection managed by the underlying GA-RC layer. An access mode selection switch 309 is provided to switch between GERAN (GSM/EDGE radio access network) and GAN (generic access network) modes. Whilst the control plane illustrated in FIG. 3 is for a dual-mode MS, i.e. one that can communicate with either a generic access network and hence operate in GAN-mode or a GSM access network in GERAN-mode (i.e. in 2G mode or A/Gb-mode), it is also conceivable that the mobile station is of a tri-mode type, capable of operating in GAN, GERAN or UTRAN (UMTS radio access network) mode (i.e. in 3G or Iu-mode).

Figure 4:
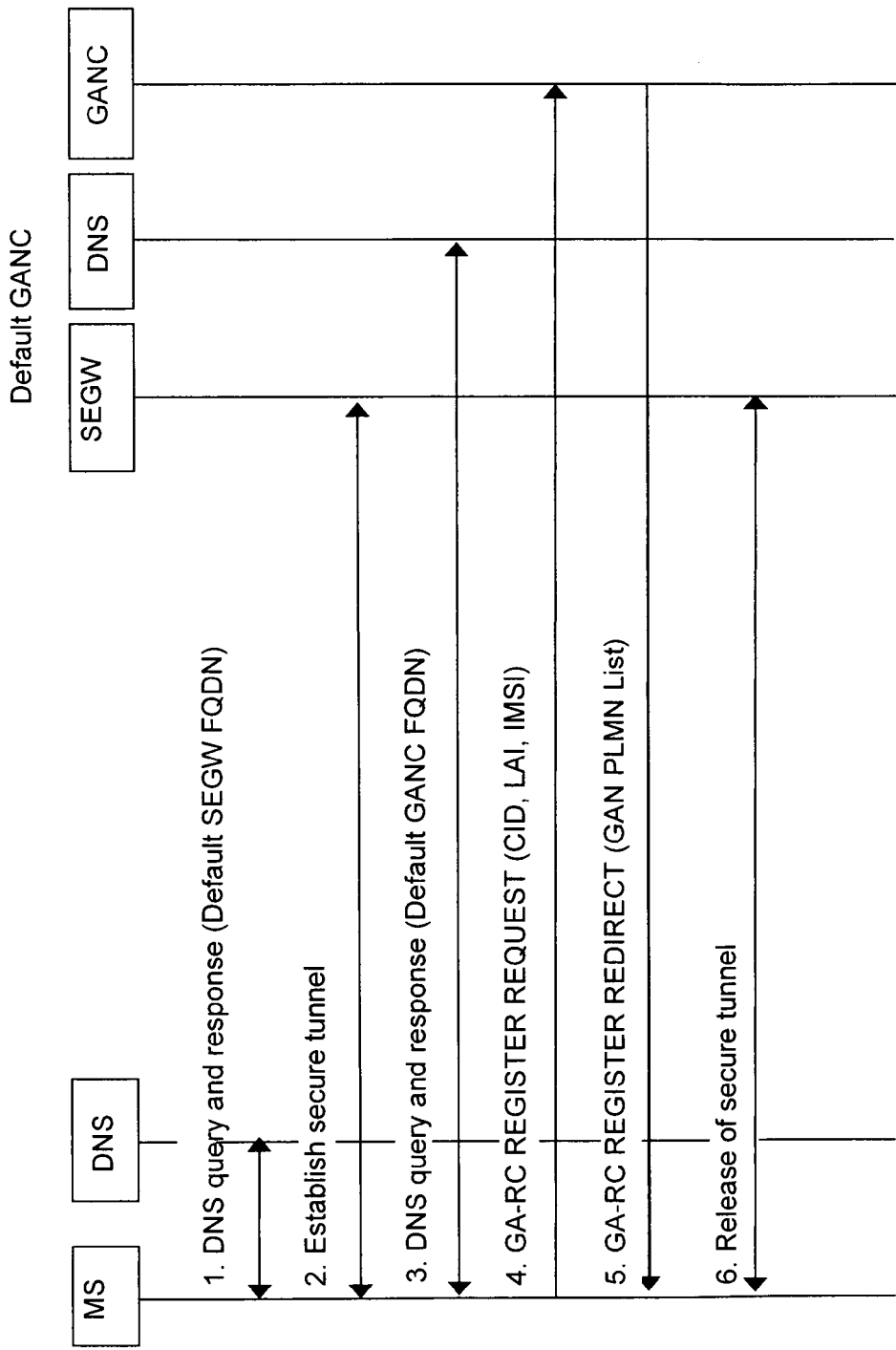
FIG. 4 illustrates the messages exchange during a registration attempt by a mobile station with the generic access network and a subsequent redirection to another public land mobile network and/or generic access network in accordance with the present invention.

A GAN registration procedure, which results in redirection is illustrated in FIG. 4. When a MS 300 desires or needs to connect to a generic access network it first registers with a default GANC 110, which is the serving GANC for the MS's home PLMN 200, in other words, the PLMN with which the MS 300 is registered or subscribes. Assuming this default GANC 110 is unable to serve the MS 300 and hence cannot accept registration, it will redirect the MS 300 to alternative GANC-PLMN pairs. This means that the home PLMN 200 is in control of which other PLMNs the subscribers are allowed to access.

The registration procedure starts with the MS connecting to the default GANC. In detail, this includes a first step of querying a domain name server, DNS, on the generic access network to obtain the address of the default security gateway SEGW, i.e. the SEGW associated with the default GANC as shown in step 1. and subsequently to establish a secure tunnel to the default SEGW as shown in step 2. A second DNS query at step 3. renders the address of the default GANC. At step 4., the MS sets up a TCP connection to a TCP port on the GANC and sends a GA-RC protocol Register Request message requesting registration with this GANC. Included in this message are location identifiers, such as the cell identity (CID), location area identity (LAI) as well as information identifying the MS or user (IMSI), which allows the GANC firstly to identify the MS, and also determine which PLMNs and GANCs are available to the MS at its current location. In addition, the MS includes an indication about supported operation modes, for example, A/Gb-mode support only, Iu-mode support only or both A/Gb and Iu-mode support. The registration request message may also include information about a preferred operation mode. This is based on preconfigured end user and/or network operator preferences for a specific operation mode or a combination of operation mode and GANC/PLMN pair. Assuming that the default GANC cannot serve the MS or is not configured to do so, it then sends a GA-RC protocol Register Redirect message at step 5. This message includes a list of PLMNs accessible via a generic access network in a so called GAN PLMN List information element. The GANC may use the information about supported or preferred operation modes received from the mobile station to select information to be included in the GAN PLMN list. It also identifies the serving GANC or GANCs for each PLMN, enabling the MS to select and register with an alternative GANC. The secure tunnel between the MS and the default GANC is then released at step 6. Once the MS logic or the end user has selected one of the GANC-PLMN pairs included in the GAN PLMN List as described in more detail below, a new GAN registration procedure is triggered towards the selected GANC.

The GAN PLMN list transmitted at step 5 is shown in FIGS. 5*a* and 5*b*. FIG. 5*a* illustrates the content of the list, while FIG. 5*b* shows the content of an information element providing PLMN information contained in the list. The list as illustrated in FIG. 5*a* starts in octet 1 with an information element identifier unique to the GAN-PLMN list. This is followed by the total length of the GAN PLMN list information element. Then the number of PLMNs is indicated at octet 3. This gives the number of information elements relating to a GAN-PLMN pair at octet 4 and above. The information elements, each one relating to a PLMN-GANC pair then follow and are shown, for example, as "PLMN Information, PLMN 1" in FIG. 5*a*.

FIG. 5*b* illustrates the structure of one information element in accordance with a first embodiment of the invention. As shown in FIG. 5*b*, each information element provides the Mobile Country Code (MCC) and Mobile Network code (MNC) identifying the PLMN concerned. It also contains the associated GANC and GANC-SEGW address information for each PLMN and may include GAN Service Zone Information. Indicators are provided at octet x+4 relating to the presence or not of service zone information (GSZI) and the coding of the GANC and SEGW addresses provided. In addition, one bit is used to indicate the GAN mode supported by the GANC in the list (Supported GAN Mode, SGM). In this context, the GAN mode is the operation mode designated by the supported interface, i.e. either A/Gb-mode or Iu-mode. This bit is, for example, set to "1" to indicate that the GANC supports the A/Gb-interface mode (i.e. 2G or GERAN services) and to "0" to indicate that the GANC supports Iu-interface mode (i.e. 3G or UTRAN services).

In the above described embodiment, the GAN PLMN list contains one entry, or information element, relating to each supported mode for a given GANC-PLMN pair. This means that, for example, the GANC-PLMN pairs GANC-1/PLMN-1 and GANC-3/PLMN-4 illustrated in FIG. 1 would have a single entry, while two entries would be provided for GANC-2 110, namely, one entry for GANC-2/PLMN-2 and one entry for GANC-2/PLMN-3. However, it is, of course, possible that a single entry could indicate all possible supported GAN modes. This might be achieved, for example, by reserving 2 or 3 bits for the indicator, which would permit the including indicators for all possibilities, namely A/Gb-mode support only, Iu-mode support only and A/Gb and Iu-mode support.

An alternative structure for an information element containing PLMN information is depicted in FIG. 5*c*. This illustrated structure differs from that shown in FIG. 5*b* only in that bit 6 in octet x+4 is no longer used to indicate a supported mode. Instead, this bit is a Supported GAN Mode Indicator (SGMI) that indicates whether information on the supported GAN mode (SGM) is included at the end of the information element. For example, the Supported GAN Mode Indicator is set to 1 when the supported GAN mode information is present in the information element, and to 0 when supported GAN mode information is not included. The Supported GAN Modes Information is illustrated as covering at lest one octet. Obviously, this information may cover fewer or more bits. This additional size permits all combinations of supported operation mode to be indicated, possibly with additional information on these modes.

Based on the information in this list, the MS can then select a suitable PLMN-GANC pair that provides the services it requires, i.e. services supported by the A/Gb interface or services supported by the Iu interfaces (Iu-cs, Iu-ps interfaces) or the required performance, since this may differ depending on whether the A/Gb interface or Iu interface is used.

As described above with reference to FIG. 3, the GA-RC protocol layer 307 in the CS control plane of the mobile station MS handles the registration procedures with the generic access network. This function includes the selection of a GANC. The PLMN selection, on the other hand, is handled by the Mobility Management protocol layer 304, which is common to both the GAN and GSM protocol layers (and also to UMTS/WCDMA layers in a tri-mode mobile station MS). In order to fully utilise the additional information provided in the redirection procedure described above with reference to FIGS. 4 and 5, the GANC selection is extended by suitable logic to enable a qualified selection based on the operation modes of the GANC/PLMN pairs indicated in the registration redirect message. Such a selection may include end user or network operator preferences for a specific GANC/PLMN pair that override another existing PLMN priority listing, or for a specific operation mode. Alternatively, or additionally, the mobile station MS may be configured to display the information on all or selected supported operation modes in a suitable manner to the end user, so enabling the end user to choose between the associated services or performance offered by each GANC/PLMN pair. Suitable logic in the MS 300 may first subject the received GAN/PLMN information to filtering and/or ordering prior to displaying it to the end user. This filtering and ordering function could take account of network operator preferences for a specific operation mode or a combination of operation mode and GANC/PLMN pair.

The invention claimed is:

1. A method of redirecting a mobile station to at least one public mobile network accessible via an unlicensed access network, comprising the steps of:
    establishing a connection between a mobile station and an unlicensed access network controller, said unlicensed access network controller arranged to serve a public mobile network;
    said access network controller receiving a registration request from said mobile station, said registration request including information indicative of the location of said mobile station; and
    said access network controller compiling a registration redirect message for transmission to said mobile station, said registration redirect message including information for identifying public land mobile networks available for access at the location of said mobile station, said information further identifying for each identified public mobile network at least one unlicensed access network controller adapted to serve said public mobile network;
    wherein said information further includes for each identified public mobile network and serving unlicensed access network controller an operation mode supported by said unlicensed access network controller, said operation mode indicative of the interface used for communication between said unlicensed access network controller and the public mobile network it serves.

2. A method as claimed in claim 1, further including the step of:
    said mobile station selecting a public mobile network and serving unlicensed access network controller on the basis of the operation mode.

3. A method as claimed in claim 1, wherein said registration request further includes information indicative of operation modes supported by the mobile station, said operation mode being indicative of the interface used for communication between an unlicensed access network controller and the public mobile network it serves, wherein said step of compiling a registration redirect message includes identifying available combinations of a public land mobile network and serving unlicensed network access controller that support the mobile station supported operation modes.

4. A method as claimed in claim 1, wherein said registration request further includes information indicative of operation modes preferred by the mobile station, said operation mode being indicative of the interface used for communication between an unlicensed access network controller and the public mobile network it serves, wherein said step of compiling a registration redirect message includes identifying available combinations of a public land mobile network and serving unlicensed network access controller that support the mobile station preferred operation modes.

5. A method as claimed in claim 1, wherein said operation mode is indicative of either A- and Gb-interfaces or Iu-cs- and Iu-ps-interfaces, or a combination of these used between said public mobile network and the serving unlicensed access network controller.

6. A method as claimed in claim 1, wherein the step of including information in said registration request message includes the step of compiling said information into a list including an information element for each unlicensed access network controller that serves an available public mobile network, each information element identifying the unlicensed access network controller and including at least one bit to indicate the operation mode supported by said unlicensed access network controller when serving said available public mobile network.

7. A method as claimed in claim 6, wherein each information element includes at least one bit to indicate the presence of information indicative of the operation mode supported by said unlicensed access network controller when serving said available public mobile network.

8. A method as claimed in claim 6, wherein each information element further identifies a security gateway associated with the public mobile network and unlicensed access network controller.

9. A method as claimed in claim 6, wherein said information element further includes address information enabling a mobile station to establish a secure connection to a public mobile network via an unlicensed access network.

10. A method as claimed in claim 1, further including the step of: in said mobile station, making said information available to the end user and allowing the end user to select a public mobile network and unlicensed access controller based on said operation mode.

11. A method as claimed in claim 1, wherein the step of establishing a connection between a mobile station and an unlicensed access network controller includes establishing a connection with a default unlicensed access network controller that is arranged to serve a home public mobile network, to which the mobile station subscribes.

12. An unlicensed access network controller adapted to communicate with mobile stations over a broadband access network and to serve a public mobile network by providing access to said public mobile network for said mobile stations via public mobile network interfaces, wherein said unlicensed access network controller is adapted to receive register requests from mobile stations requesting access to a public mobile network and to identify from location information contained in said register requests public mobile networks and associated serving unlicensed access network controllers available at the location of said mobile station, said unlicensed access network controller being further adapted to compile information of available public mobile networks and serving unlicensed access network controllers in a registration redirect message to be transmitted to said mobile station, said information including for each public mobile network and serving unlicensed access network controller an operation mode supported by said unlicensed access network controller that is indicative of the interface used for communication between said unlicensed access network controller and the public mobile network it serves.

13. A controller as claimed in claim 12, wherein said operation mode is indicative of A- and Gb-interfaces, Iu-cs- and Iu-ps-interfaces or a combination of these used to provide access to said served public mobile network.

14. A controller as claimed in claim 12, wherein said controller is further adapted to compile said information into a list including an information element for each unlicensed access network controller that serves an available public land mobile network, each information element identifying the unlicensed access network controller and including at least one bit to indicate the operation mode supported by said unlicensed access network controller, and to send said list in said register redirect message.

15. A controller as claimed in claim 14, wherein each information element further identifies a security gateway associated with the public land mobile network and unlicensed access network controller.

16. A controller as claimed in claim 13, wherein said information element further includes address information enabling a mobile station to establish a secure connection to a public mobile network via an unlicensed access network.

17. A controller as claimed in claim 12, wherein the unlicensed network controller is adapted to serve is a home public mobile network with which said mobile station is a subscriber.

18. A mobile station adapted to communicate with public land mobile networks via public land mobile access networks using at least one public land mobile network radio access technology and via unlicensed radio access network controllers using unlicensed radio access technology, said mobile station comprising a logic module adapted to send a registration request message to an unlicensed access network controller in order to obtain access to a public mobile network, said registration request message including information identifying the mobile station location, and to receive in response a registration redirect message including information of available public mobile networks and serving unlicensed access network controllers, said information including for each pair of public mobile network and serving unlicensed access network controller an operation mode supported by said unlicensed access network controller that is indicative of the interface used for communication between said unlicensed access network controller and the public mobile network it serves, and to attempt registration with a selected one of the serving unlicensed access network controllers to obtain access to the corresponding public mobile network with a specific operation mode.

19. A mobile station as claimed in claim 18, wherein said module is further adapted to select one of the available public mobile networks and serving unlicensed access network controllers based on the supported operation mode provided in said registration redirect message.

20. A mobile station as claimed in claim 19, wherein said module is further adapted to select one of the available public mobile networks and serving unlicensed access network controllers using configured preferences for a specific operation mode, for a particular combination of public mobile network and serving unlicensed access network controller, or for both of these.

21. A mobile station as claimed in claim 18, wherein said module is further adapted to display information relating to at least one available public mobile network and serving unlicensed access network controller to the end user, said information including an indication of the supported operation mode, to enable a manual selection.

22. A mobile station as claimed in claim 21, wherein said module is further adapted to order and/or filter information based on configured preferences for a specific operation mode, for a particular combination of public mobile network and serving unlicensed access network controller, or for both of these.

* * * * *

UNITED STATES PATENT AND TRADEMARK OFFICE
CERTIFICATE OF CORRECTION

PATENT NO. : 8,254,313 B2  
APPLICATION NO. : 12/742203  
DATED : August 28, 2012  
INVENTOR(S) : Vikberg et al.

Page 1 of 2

It is certified that error appears in the above-identified patent and that said Letters Patent is hereby corrected as shown below:

In Column 1, Line 45, delete "GANG." and insert -- GANC. --, therefor.

In Column 1, Line 52, delete "7" and insert -- 7. --, therefor.

In Column 1, Line 61, delete "GANG" and insert -- GANC --, therefor.

In Column 1, Line 63, delete "GANG" and insert -- GANC --, therefor.

In Column 1, Line 67, delete "GANG" and insert -- GANC --, therefor.

In Column 2, Line 18, delete "UNITS" and insert -- UMTS --, therefor.

In Column 3, Line 34, delete "or a for" and insert -- or for --, therefor.

In Column 3, Line 48, delete "(UTMS/WCDMA" and insert -- (UMTS/WCDMA --, therefor.

In Column 5, Line 2, delete "imposed" and insert -- imposed. --, therefor.

In Column 7, Line 37, delete "1." and insert -- 1, --, therefor.

In Column 7, Line 39, delete "step 3." and insert -- step 3, --, therefor.

In Column 7, Line 39, delete "4.," and insert -- 4, --, therefor.

In Column 8, Line 60, delete "at lest" and insert -- at least --, therefor.

In Column 9, Line 44, in Claim 1, delete "and" and insert -- and, --, therefor.

Signed and Sealed this
Eighteenth Day of December, 2012

David J. Kappos
*Director of the United States Patent and Trademark Office*

CERTIFICATE OF CORRECTION (continued)
U.S. Pat. No. 8,254,313 B2

In Column 10, Lines 19-20, in Claim 5, delete "lu-cs- and lu-ps-interfaces," and insert -- Iu-cs- and Iu-ps-interfaces, --, therefor.

In Column 11, Lines 13-14, in Claim 13, delete "lu-cs- and lu-ps-interfaces" and insert -- Iu-cs- and Iu-ps-interfaces --, therefor.